United States Patent
Maple et al.

(10) Patent No.: US 6,862,149 B2
(45) Date of Patent: Mar. 1, 2005

(54) SEARCHING FOR APPEND POINT IN DATA STORAGE DEVICE

(75) Inventors: Catharine Anne Maple, Bristol (GB); Jonathan Peter Buckingham, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 220 days.

(21) Appl. No.: 09/881,763

(22) Filed: Jun. 18, 2001

(65) Prior Publication Data

US 2002/0191316 A1 Dec. 19, 2002

(51) Int. Cl.[7] .............................................. G11B 5/09
(52) U.S. Cl. ........................ 360/48; 360/49; 360/72.2
(58) Field of Search ...................... 360/49, 72.2, 78.14, 360/48, 31, 75, 53; 714/43; 369/59.19

(56) References Cited

U.S. PATENT DOCUMENTS

| | | | | |
|---|---|---|---|---|
| 4,390,909 A | * | 6/1983 | Sakamoto ..................... | 360/71 |
| 4,559,568 A | | 12/1985 | Watanabe et al. | |
| 4,604,657 A | | 8/1986 | Fukami et al. | |
| 5,339,108 A | * | 8/1994 | Coleman et al. ......... | 375/240.2 |
| 5,384,669 A | * | 1/1995 | Dunn et al. .................... | 360/48 |
| 5,396,374 A | * | 3/1995 | Kubota et al. ................ | 360/27 |
| 5,450,250 A | * | 9/1995 | Garcia et al. ................. | 360/48 |
| 5,543,977 A | * | 8/1996 | Shih et al. ..................... | 360/48 |
| 5,633,855 A | * | 5/1997 | Naito ....................... | 369/59.19 |
| 5,731,922 A | * | 3/1998 | Yamasaki et al. ............. | 360/53 |
| 5,818,654 A | * | 10/1998 | Reddy et al. ................. | 360/53 |
| 5,905,600 A | * | 5/1999 | Nieuwkerk ................... | 360/48 |
| 6,532,128 B1 | * | 3/2003 | Bui et al. ................... | 360/74.1 |

FOREIGN PATENT DOCUMENTS

| | | |
|---|---|---|
| EP | 0286412 | 10/1988 |
| WO | 99/50850 | 10/1999 |

OTHER PUBLICATIONS

WO 99/50850, Oct. 1999, Data Storage Apparatus and Methods to Nonoyama et al.*
"Construction of Error Resilient Synchronization Codeword for Variable–Length Code in Image Transmission", Department of Electronics Engineering, by Yew–San et al., 2000, IEEE. pp. 360–363.*

* cited by examiner

*Primary Examiner*—Sinh Tran
*Assistant Examiner*—Glenda P. Rodriguez

(57) ABSTRACT

There is disclosed a method of accurately locating an append point along a length of linear tape data storage medium, comprising entering a search mode searching for an absolute code word quad set number, and having found the absolute code word quad set number, entering an interrupt mode for control of tape transport, followed by a write mode to write data at a data set containing the absolute code word quad set number.

13 Claims, 13 Drawing Sheets

Code Word Pair Header 700

| Byte Position | Length in Bytes | Name of Field |
|---|---|---|
| 0 | 2 | Code word identifier |
| 2 | 4 | Write pass |
| 6 | 2 | Absolute CQ sequence number (ACN) |
| 8 | 2 | Code word identifier |

Fig. 7

SEARCHING FOR APPEND POINT IN DATA STORAGE DEVICE

FIELD OF THE INVENTION

The present invention relates to data storage devices, and particularly although not exclusively to a method and apparatus for searching for an append point on a data storage medium.

BACKGROUND TO THE INVENTION

The assignees have developed a linear tape open format (LTO) data storage device, having a drive mechanism, and a linear tape data storage medium stored on a removable cartridge. In such LTO format devices, in order to begin writing data to the tape, the tape drive device must locate a suitable point along the tape data storage medium from which to start writing data. In the case of a tape data storage medium already having data written on it, the LTO format uses a longitudinal position data marker (LPOS) to locate an end of data already written to tape.

In the LTO format, there are recorded a plurality of parallel data tracks, running along a main length of the tape as well as a plurality of set of servo tracks running in parallel with the data tracks. As the tape moves past the read head, pulses from the servo track are counted, which gives an indication of the position of the read head along the length of the tape. This position is referred to as the longitudinal position (LPOS).

However, using the longitudinal position marker, the accuracy of positioning the tape head with respect to the linear tape is of the order of several code word quad (CQ) i.e. a set of two code word pairs, sets, and is close to the maximum append latency allowed by the format. This may lead to a format violation or another reposition operation, causing inefficiency.

In the LTO format the LPOS data gives a position along the tape for individual C1 code word pairs. However, the same position can apply to a plurality of consecutive C1 code word pairs and is not accurate down to the C1 code word pair level. Therefore, for writing data to the tape to append the existing data, the write head on the tape drive mechanism needs to be positioned at a position along the linear tape at the end of a current recorded data, in order to start a write or overwrite operation of new data onto the tape. The problem with the linear position data, is that because one LPOS data can apply to a plurality of sequentially written C1 code word pairs already on the tape, there is ambiguity on where to start writing. Therefore the LTO format skips to the next vacant LPOS, which incurs wastage of tape medium since writing may not start immediately after the last C1 code word pair in a data set.

Since up to 4 C1 code word quads can fall within the same LPOS number, a more accurate system is required.

The method of locating an end of data position longitudinally along a tape data storage medium is relatively inaccurate, compared to a length of tape occupied by a stored code word quad, which results in an unnecessarily high probability of format violations or tape reposition operations when searching for an end of data.

SUMMARY OF THE INVENTION

Specific implementations according to the present invention search a linear tape data storage medium using an absolute code word quad set number. An exact code word quad set is searched for, maximizing the ability to begin an append of data within a quad limit of a specified number of code word quads, along a length of tape.

In the best mode implementation, an absolute code word quad set number for each code word quad is stored in a header data associated with each code word pair on the linear tape data storage medium. During searching by a tape drive mechanism, the absolute code word quad number is derived for each code word quad set. When a desired position along the tape has been found, an append of data can begin by the tape drive writing data along the tape subsequent to the found desired end of data position.

According to a first aspect of the present invention there is provided a method of locating a position on a data storage medium from which to write data, said method comprising the steps of:

transporting said linear data storage medium past a read head;

reading a linear position data describing a linear position along said linear data storage medium and from said linear position data determining an approximate position of an append position from which to start writing data;

having found said approximate position of said append point, reading an absolute C1 code word quad identifier number to identify individual C1 code word quads along the length of said data storage medium;

comparing said read absolute C1 code word quad number with a target absolute C1 code word quad number;

finding a correspondence between said read absolute C1 code word quad number and said target absolute C1 code word quad number;

if a match between said read absolute C1 code word quad and said target absolute C1 code word quad number is found, then generating an interrupt signal to interrupt transport of said data storage medium past said read head; and commencing a write operation from a position of said read absolute C1 code word quad number which matches said target absolute C1 code word quad number.

According to a second aspect of the present invention there is provided a method of locating an append point along a length of linear data storage medium, said append point indicating a position from which to write data along said linear data storage medium, said method comprising the steps of:

reading a plurality of absolute C1 code word quad numbers from at least one track of said data storage medium;

comparing said read absolute C1 code word quad number with a pre-stored target absolute C1 code word quad number;

finding a match between a read absolute C1 code word quad number and said stored target absolute C1 code word quad number;

generating an interrupt signal for interrupt of transport of said tape data storage medium.

According to a third aspect of the present invention there is provided a computer program comprising program instructions for implementing a method of locating a position on a data storage medium from which to write data, said method comprising the steps of:

transporting said data storage medium past a read head;

reading a linear position data describing a linear position along said linear data storage medium and from said linear position data determining an approximate position of an append position from which to start writing data;

having found said approximate position of said append point, reading an absolute C1 code word quad identifier number to identify individual C1 code word quads along the length of tape data storage medium;

comparing said read absolute C1 code word quad numbers with a target absolute C1 code word quad number;

finding a correspondence between said read absolute C1 code word quad number and said target absolute C1 code word quad number;

if a match between said read absolute C1 code word quad and said target absolute C1 code word quad number is found, then generating an interrupt signal to interrupt transport of said data storage medium past said read head; and commencing a write operation from a position of said read absolute C1 code word quad number which matches said target absolute C1 code word quad number.

According to a fourth aspect of the present invention there is provided a tape data storage device comprising:

a read head and a write head;

a tape transport mechanism for transporting said linear tape data storage medium across said read head and said write head;

a search component operating to:

read a linear position data describing a linear position along said linear tape data storage medium and from said linear position data determine an approximate position of an append position from which to start writing data;

read an absolute C1 code word quad identifier number to identify individual C1 code word quads along a length of said linear tape data storage medium;

compare said read absolute C1 code word quad number with a target absolute C1 code word quad number;

find a correspondence between said read absolute C1 code word quad number and said target absolute C1 code word quad number;

if a match between said read absolute C1 code word quad and said target absolute C1 code word quad number is found, then generate an interrupt signal to interrupt transport of said linear tape data storage medium past said read head; and commence a write operation from a position of said read absolute C1 code word quad number which matches said target absolute C1 code word quad number.

According to a fifth aspect of the present invention there is provided a recording medium comprising program instruction data for implementing a method of locating a position on a data storage medium from which to write data, said method comprising the steps of:

transporting said data storage medium past a read head;

reading a linear position data describing a linear position along said linear data storage medium and from said linear position data determining an approximate position of an append position from which to start writing data;

having found said approximate position of said append point, reading an absolute C1 code word quad identifier number to identify individual C1 code word quads along the length of said data storage medium;

comparing said read absolute C1 code word quad numbers with a target absolute C1 code word quad number;

finding a correspondence between said read absolute C1 code word quad number and said target absolute C1 code word quad number;

if a match between said read absolute C1 code word quad and said target absolute C1 code word quad number is found, then generating an interrupt signal to interrupt transport of said data storage medium past said read head; and commencing a write operation from a position of said read absolute C1 code word quad number which matches said target absolute C1 code word quad number.

According to a sixth aspect of the present invention there is provided an electrical signal comprising digital program instruction data for implementing a method of locating a position on a data storage medium from which to write data, said method comprising the steps of:

transporting said data storage medium past a read head;

reading a linear position data describing a linear position along said linear data storage medium and from said linear position data determining an approximate position of an append position from which to start writing data;

having found said approximate position of said append point, reading an absolute C1 code word quad identifier number to identify individual C1 code word quads along the length of said data storage medium;

comparing said read absolute C1 code word quad numbers with a target absolute C1 code word quad number;

finding a correspondence between said read absolute C1 code word quad number and said target absolute C1 code word quad number;

if a match between said read absolute C1 code word quad and said target absolute C1 code word quad number is found, then generating an interrupt signal to interrupt transport of said data storage medium past said read head; and commencing a write operation from a position of said read absolute C1 code word quad number which matches said target absolute C1 code word quad number.

According to a seventh aspect of the present invention there is provided a method of locating a position on a data storage medium from which to write data, said method comprising the steps of:

transporting said linear data storage medium past a read head;

reading an absolute C1 code word quad identifier number to identify an individual C1 code word quad along a length of said data storage medium;

comparing said read absolute C1 code word quad number with a target absolute C1 code word quad number;

determine a correspondence between said read absolute C1 code word quad number and said target absolute C1 quad number;

on finding a correspondence, generating an interrupt signal to interrupt transport of said data storage medium past said read head.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which:

FIG. 7 illustrates schematically a C1 codeword pair header containing an absolute codeword quad sequence number (ACN);

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

Figure 1:
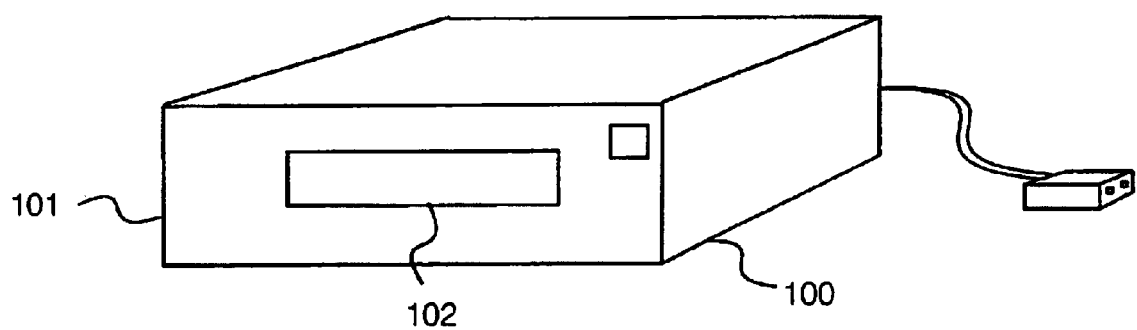
FIG. 1 illustrates schematically in perspective view a tape data storage device according to specific implementation of the present invention.

Referring to FIG. 1 herein, there is illustrated schematically in perspective view, a tape data storage device according to a specific implementation of the present invention for reading from and writing to a linear tape data storage medium, stored on a cassette cartridge, the tape drive containing components for writing an append point to locate an end of data, and for reading the append point written to the tape data storage medium. The tape data storage device comprises a casing 100 having a front fascia 101 having a slot 102 for accepting a tape cassette cartridge; an internal tape transport drive mechanism capable of fast forward, fast rewind, search, playback and record modes; a communications interface for communicating data in and data out with a host computer device into which the tape data storage device can be installed as a component; and an internal control component, typically implemented as firmware stored in a memory device which may be programmable to download software upgrades to control the operation of the tape data storage device.

Figure 2:
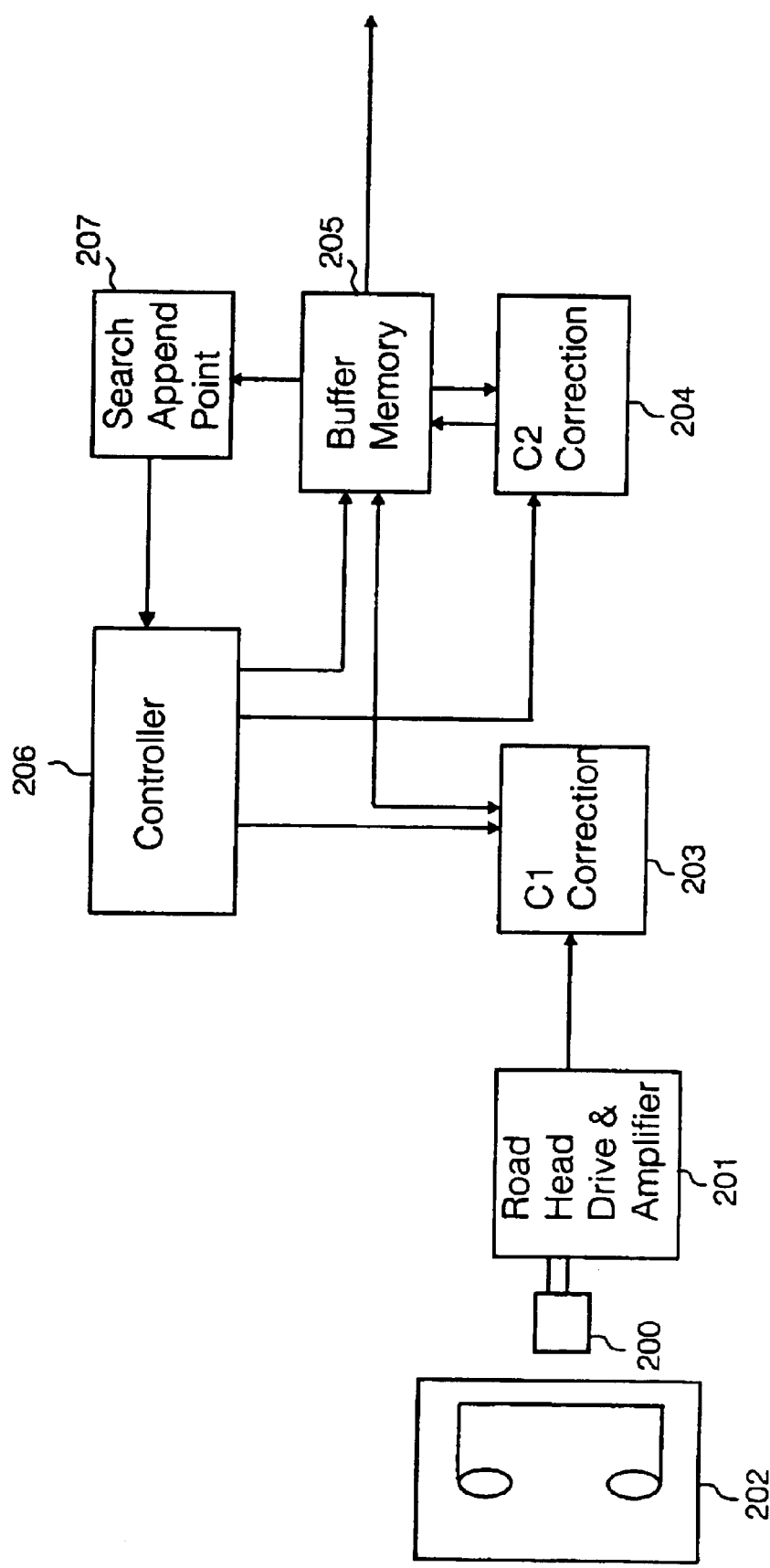
FIG. 2 illustrates schematically a read channel of the tape data storage device of FIG. 1.

Referring to FIG. 2 herein, there is illustrated schematically a read channel of the tape data storage device of FIG. 1. The read channel comprises a magnetic read head 200 with associated read head amplifier circuitry 201 for reading data from a linear magnetic tape contained in a cartridge cassette 202; a C1 error correction component 203 for applying C1 correction to C1 code words read from the tape; a C2 correction component 204 for applying C2 correction to a plurality of C1 code word pairs output from C1 correction module 203 and stored in a buffer memory 205; buffer memory 205 into which complete sub data sets having user data as C2 bytes are stored for the C2 correction module 204 to apply C2 corrections; and a controller component 206 for controlling the read head drive mechanism and amplifier 201, controlling passage of data through the C1 correction component 203 and C2 correction component 204 and buffer memory 205, the controller component 206 comprising a search append point component 207 which operates to search data on a linear tape to determine an append point from which pre-written data can be overwritten by newly written data, or in the absence of pre-written data, a point from which newly written data can be written, the search append point component 207 receiving an output from the buffer memory 205.

Figure 3:
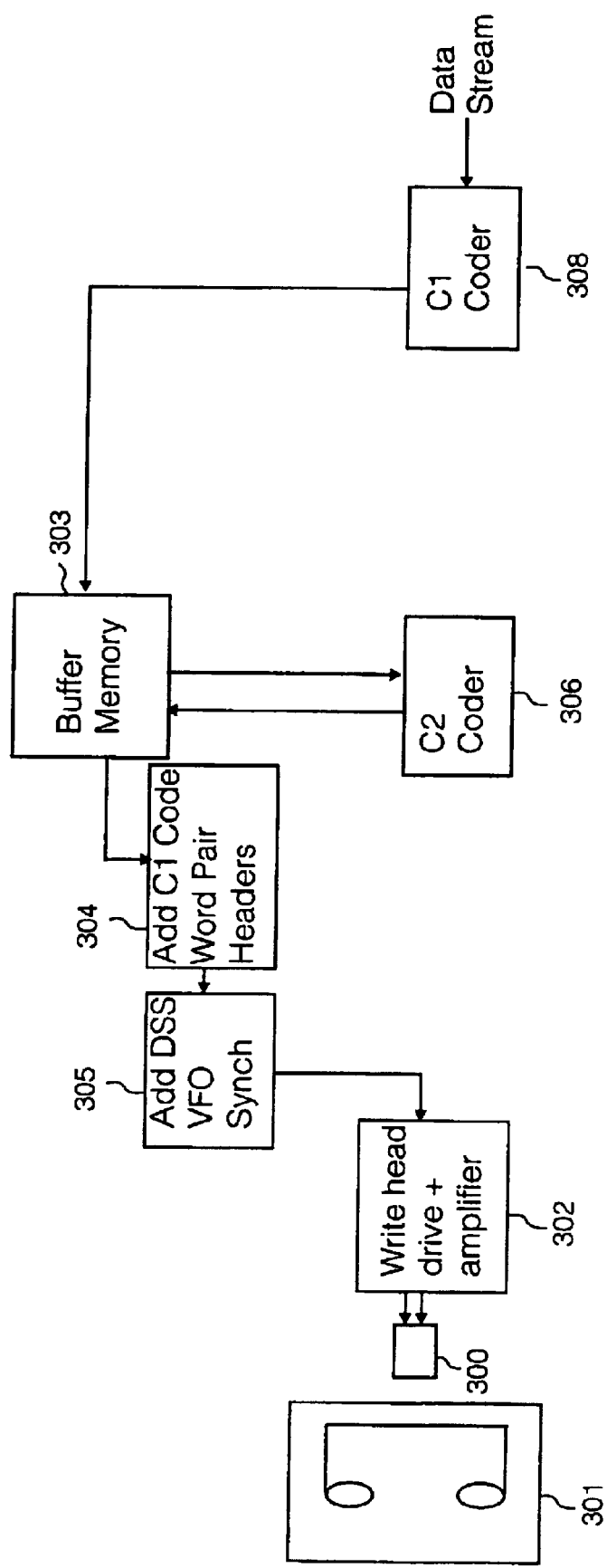
FIG. 3 illustrates schematically components of a write channel of the tape data storage device of FIG. 1.

Referring to FIG. 3 herein, there is illustrated schematically a write channel of the tape data storage device of FIGS. 1 and 2 for writing data to a linear tape data storage medium. The write channel comprises a write head 300 in physical contact with the linear tape data storage medium contained in cassette cartridge 301; a write head drive mechanism including amplifier 302; a buffer memory 303 for storing data prior to input to the drive mechanism and amplifier 302, and accumulating data into sub data sets; a header adding component 304 for adding header information to C1 codewords; a data set separator field (DSS), forward synchronization field (FS), re-synchronization field (RS), back synchronization field (BS), absolute codeword quad set number (ACN) and VFO field header 305 for adding those fields to pairs of C1 code word pairs to form synchronized C1 code word quads having an absolute codeword quad set number (ACN) in each C1 codeword; a C2 coder 306 for applying C2 error correction coding to sub data sets stored in buffer memory 303; and a C1 coder 308 for creating C1 code word pairs from an incoming data stream of user data. Longitudinal position data (LPOS) is stored as a status byte in buffer memory 205 alongside each C1 codeword pair. A C1 codeword quad contains header, data and C1 parity information for 2 codeword pairs. A synchronized C1 codeword quad contains extra synchronization fields as described above. The write channel of FIG. 3 is prior art known to those skilled in the art.

Writing of new data may overwrite existing data stored on a tape data storage medium. The tape drive mechanism operates to determine a position at an end of data, for the purposes of writing new data, and also determine a position on a new tape on which no data is stored, from which to write data.

Figure 4:
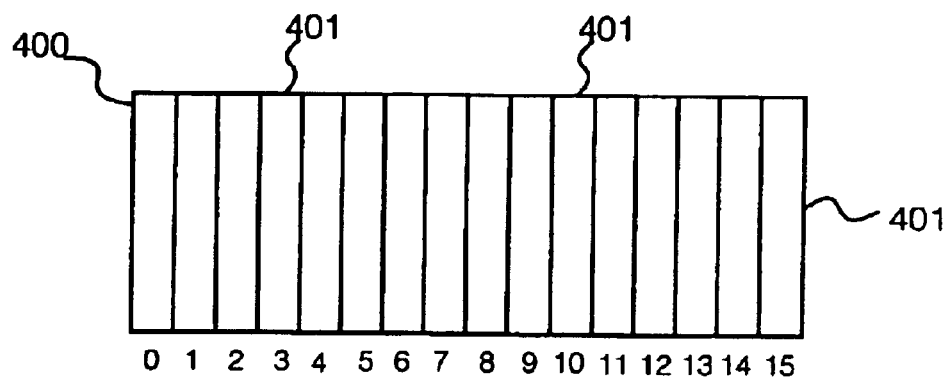
FIG. 4 illustrates schematically a logical layout of a data set comprising a plurality of sub data sets.

Referring to FIG. 4 herein, there is illustrated schematically a logical layout of a data set 400 stored on the tape data storage medium. The data set comprises 492 Kbytes of data, subdivided into 16 sub data sets 401.

Figure 5:
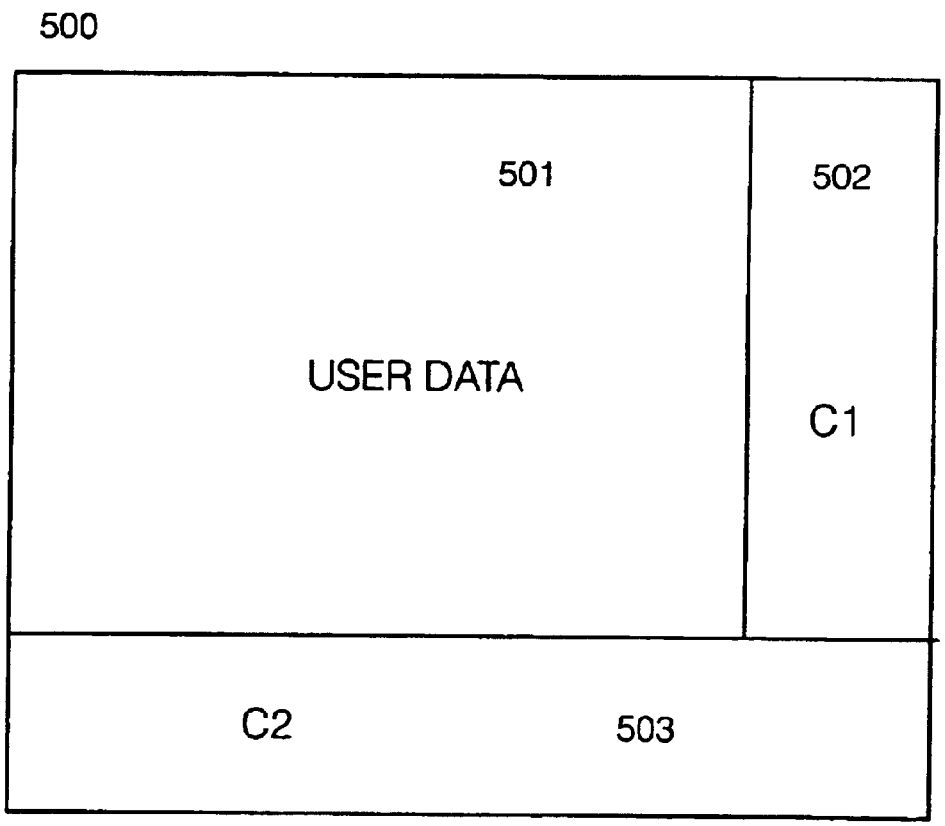
FIG. 5 illustrates schematically a logical layout of a sub data set of FIG. 4.

Referring to FIG. 5 herein, there is illustrated schematically a logical layout of a sub data set. Each sub data set 500 comprises a block of user data 501 of 25 Kbytes as well as C1 error correction coding 502, and C2 error correction coding 503.

Figure 6:
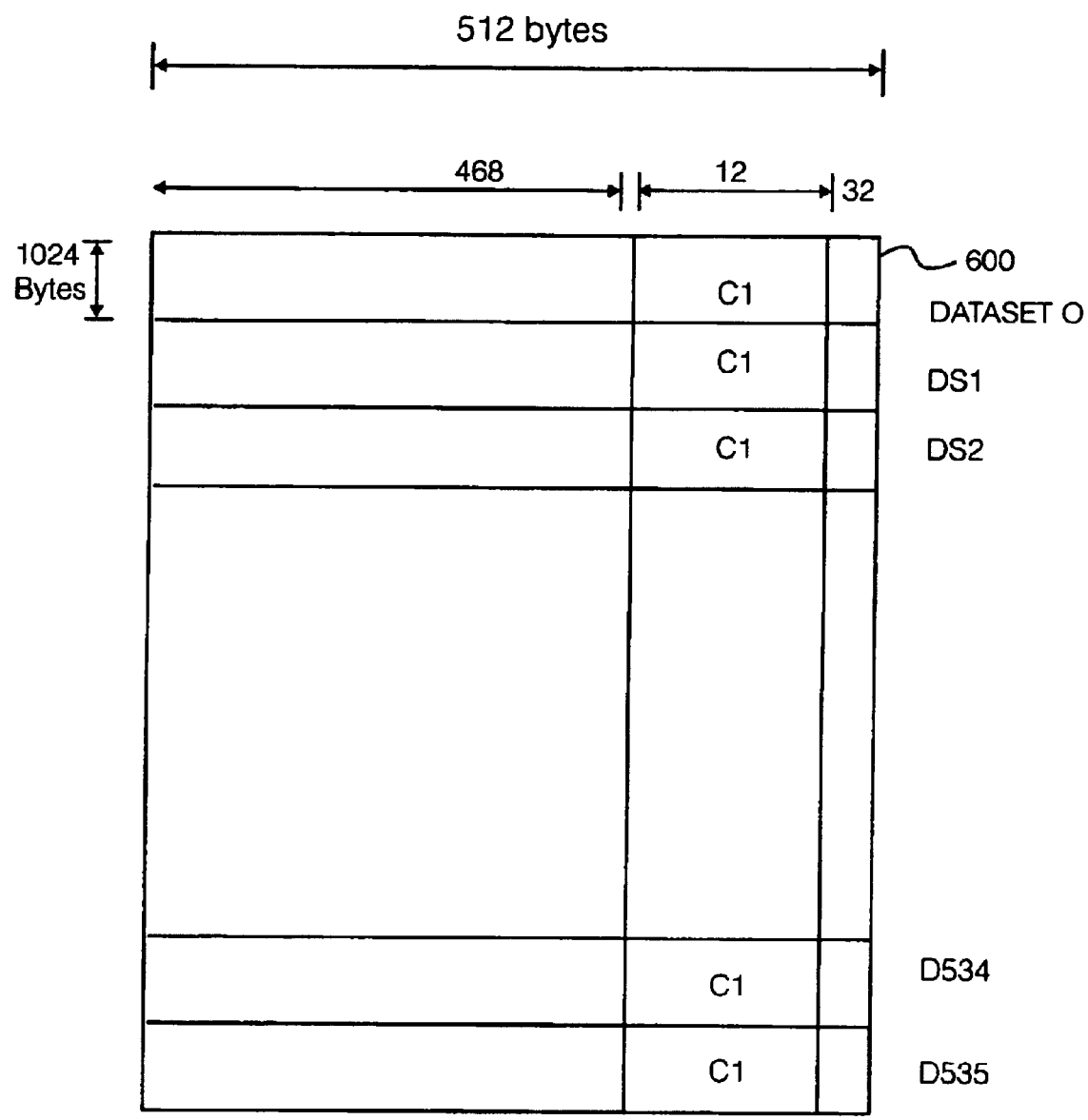
FIG. 6. Illustrates schematically storage of a plurality of data sets in a buffer of the tape data storage device, read from a linear tape data storage medium.

Referring to FIG. 6 herein, there is illustrated schematically a plurality of data sets recovered from a tape data storage medium by the read channel, and stored in buffer 205. In the best mode implementation 36 data sets are stored in the buffer, however, this number can be varied without departing from the scope of the invention. Along with each data set is stored a corresponding respective information table 600, storing header and LPOS information and other debug status information. The information table for each data set comprises a 32×1024 byte data array.

Referring to FIG. 7 herein, there is illustrated schematically data fields within a C1 codeword pair header 700. At byte position 0, there is a codeword identifier field of length 2 bytes. At byte position 2 there is a write pass field of length 4 bytes. At byte position 6, there is an absolute codeword quad set number (ACN) of length 2 bytes and at byte position 8 there is header parity field of length 2 bytes.

Figure 8:
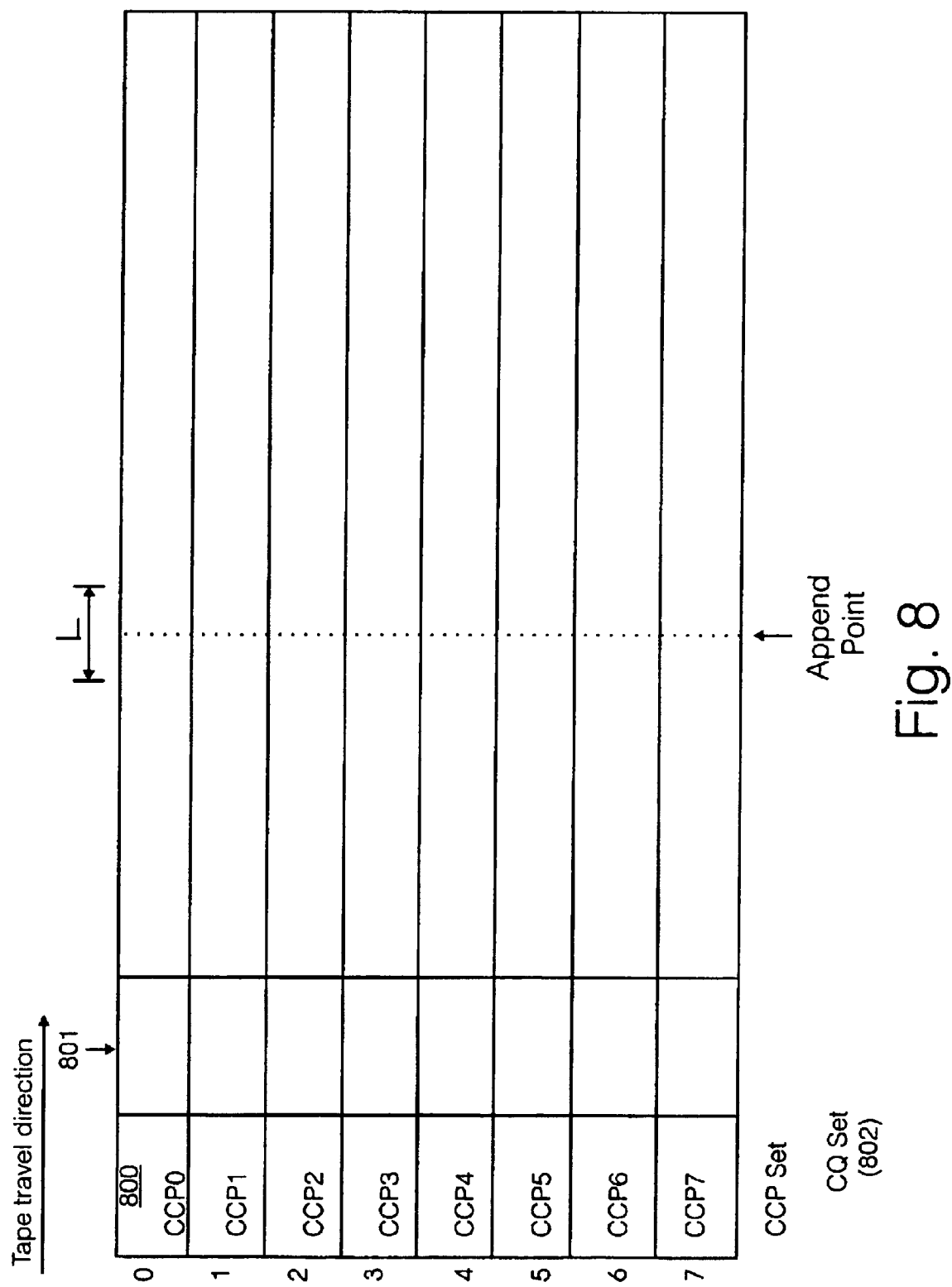
FIG. 8 illustrates schematically a physical layout of a plurality of parallel data tracks written along a linear tape data storage medium, showing physical layout of a plurality of C1 code word pairs, and a C1 code word quad set.

Referring to FIG. 8 herein, there is illustrated schematically a physical layout of data written to tape data storage medium. Eight channels (labelled 0–7) are written in parallel along the length of the tape. A single C1 code word pair is written along a length of tape along one track 800. Eight such C1 code word pairs written in parallel comprise a C1 code word pair set. A successive write of a C1 code word pair set comprising 8 further C1 code word pairs written in parallel on the 8 tracks gives a C1 code word quad set 802. A C1 code word quad set comprises 8 times 4 C1 code words, or 2×8 C1 code word pairs.

The tape data storage device searches along the length of the tape to locate the append point within a latency L specified as a pre-determined number of code words quad.

Figure 9:
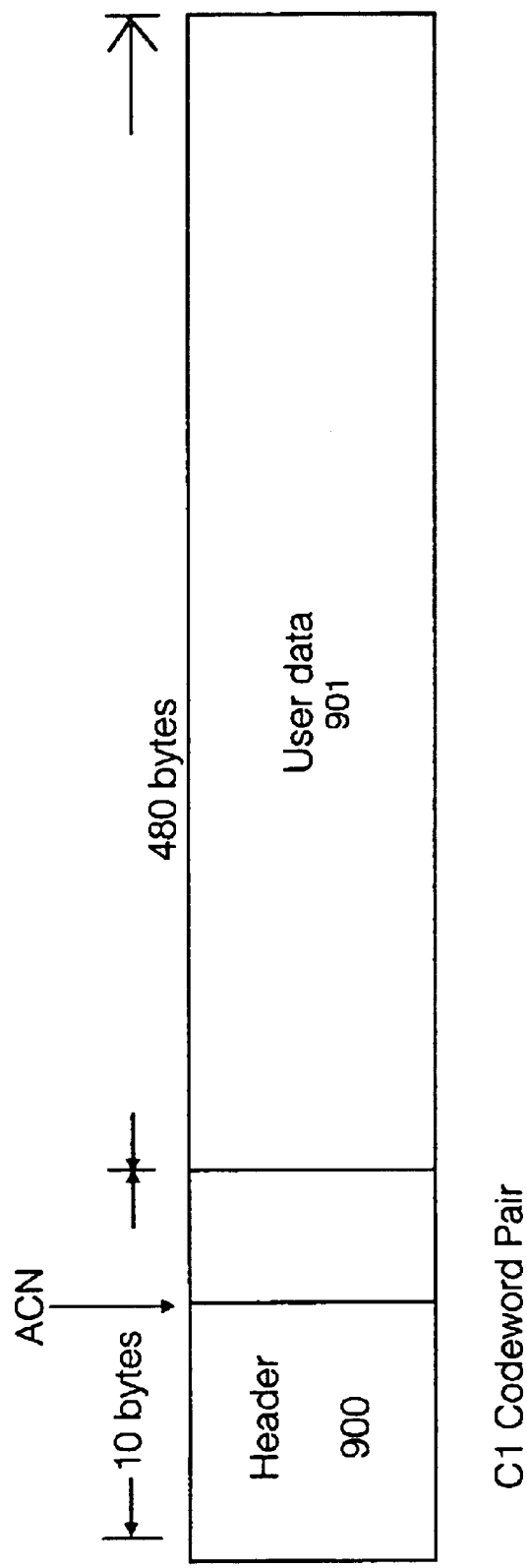
FIG. 9 illustrates schematically a C1 code word pair having an absolute code word quad set number embedded in a header of the C1 code word pair.

Referring to FIG. 9 herein, a C1 code word pair comprises 10 bytes of header data 900 followed by 480 bytes of user data and C1 parity. The 10 bytes of header data 900 carry an absolute code word quad set number (ACN) uniquely identifying a code word quad set to which the code word pair belongs. Each code word pair within a code word quad set 802 carries a same absolute code word quad number, which is different to an absolute code word quad number for any different code word quad set.

Figure 10:
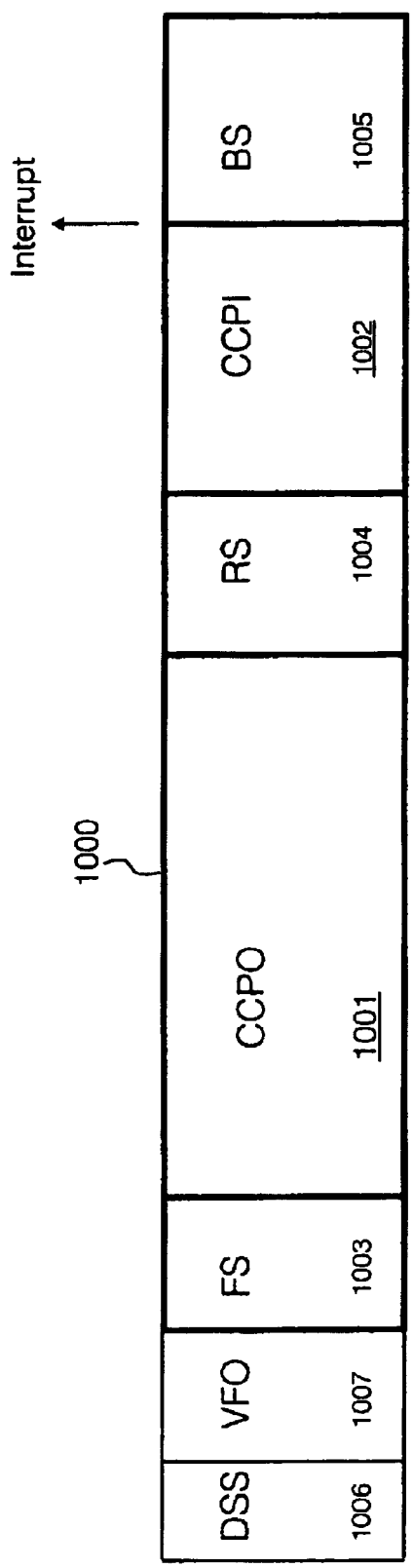
FIG. 10 illustrates schematically a logical layout of a C1 code word quad comprising two C1 code word pairs.

Referring to FIG. 10 herein, there is illustrated a logical structure of a synchronized C1 code word quad 1000. A C1 code word quad comprises first and second C1 code word pairs 1001, 1002 respectively; the first C1 code word pair preceded by a forward synchronization field 1003, and succeeded by a re-synchronization field 1004 interspaced between the first C1 code word pair and the second C1 code word pair. The second C1 code word pair 1002 is terminated by a back synchronization field 1005. The synchronized C1 codeword quad is preceded by a data set separator field (DSS) 1006, for indicating whether or not data set separation occurs at the beginning of the C1 code word quad set; and a VFO field 1006 which enables synchronization onto the following field synchronization field 1003 and successive fields. The DSS field can vary in byte length over a wide range of lengths.

According to the linear tape open format (LTO), there is provided an absolute code word quad set number value in each corresponding respective 10 byte header for each C1 code word pair in a code word quad set. Every time a new C1 code word pair is written to tape, in the 10 byte header field there is provided an absolute code word quad set number, which increments over successive C1 code word pairs, so that each C1 code word quad set has a unique absolute code word quad set number (ACN). ACN's may wrap, so as to duplicate after a pre-determined distance along the tape, however this distance is great enough that ambiguity between identical ACN's along the tape is highly improbable.

This absolute code word quad set number is used to locate a position along the tape, corresponding to an append point. The position can be located to within an accuracy of 1 C1 code word quad.

Figure 11:
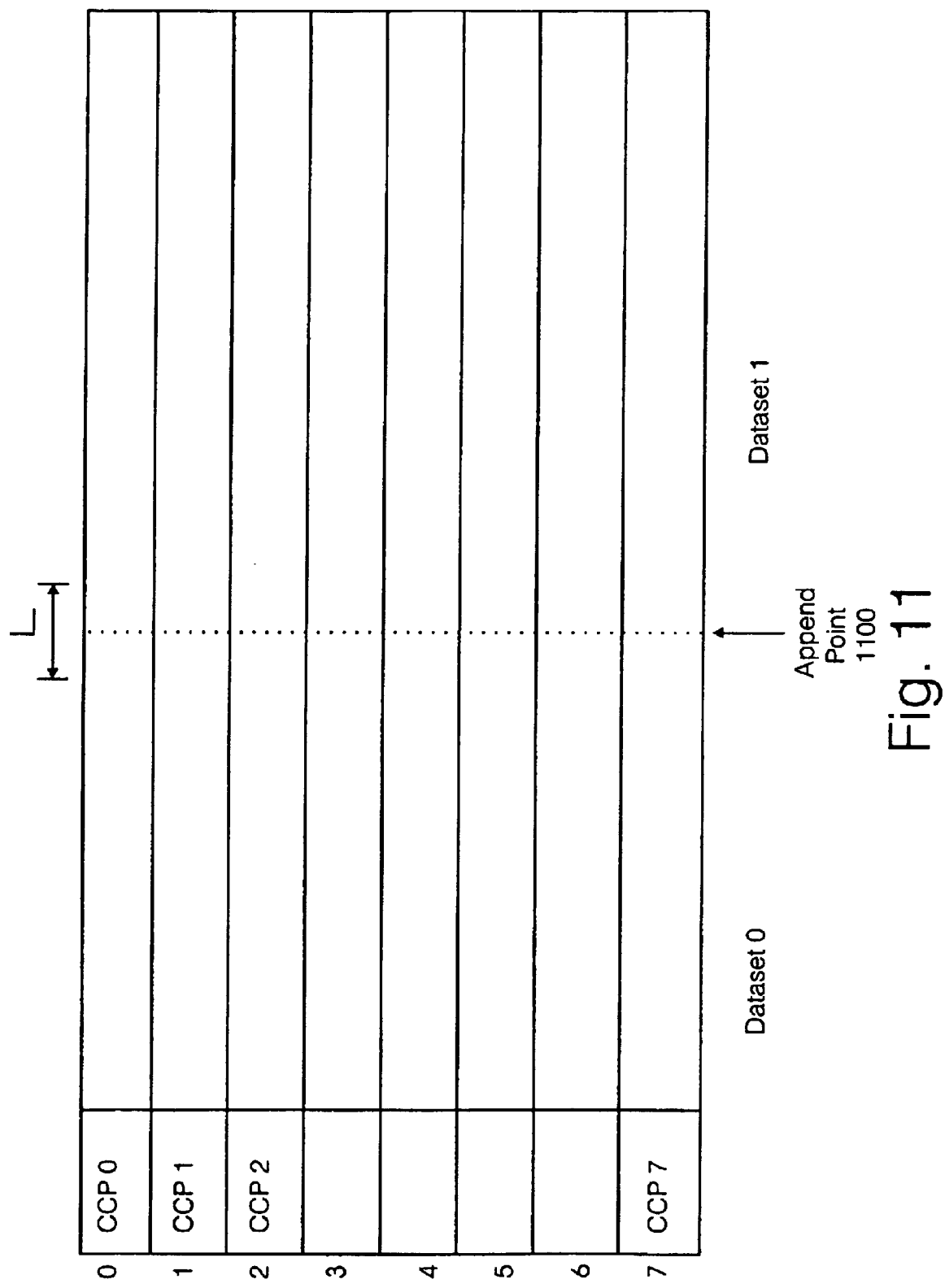
FIG. 11 illustrates schematically a position of an append point between first and second data sets stored along a length of linear tape data storage medium.

Referring to FIG. 11 herein, there is illustrated schematically a portion of linear tape data storage medium containing 8 tracks in parallel, upon which first and second data sets are written. In practice, across a width of the tape there may be hundreds of individual tracks in parallel. FIG. 11 shows only 8 tracks which are written in parallel with each other during a single write operation, and which are read in parallel during a single read operation. However, the methods disclosed herein would work equally well if there were only one track. An append point 1100 between the first and second data sets can be specified with a latency L being an error in longitudinal position along the tape, which is specified by a data storage format specification. The latency length L is a length in bytes within which, having detected the append point, the tape drive must commence writing, without incurring an overshoot of the tape past the write head, and therefore without requiring a tape direction reversal from the direction of initial search, to reverse back onto the append point. Since the tape is travelling at speed past the read head and there is a time delay incurred in the tape drive in switching from read mode to write mode, this corresponds to a physical length of tape which has traversed the head between detection of the append point and setting the tape drive into write mode.

The length of tape passing the head between detecting the append point and commencing writing must be within a specified latency L.

The linear tape open format specifies that no more than 14 codeword quad sets of a data set to be overwritten may be residual, i.e. not overwritten because writing started too late. Therefore, the latency length L is defined such that this limit is not exceeded.

The append point is defined as being the boundary between two data sets. This could be the first codeword quad of the data set to be overwritten, or the last codeword quad of a previous data set. Because the previous data sets are stored in the buffer memory, the absolute C1 code word quad set number (ACN) of the append point is known, at the beginning of a data set. Using the ACN to locate the append point is a more accurate way of locating it than using the LPOS information in the prior art.

Figure 12:
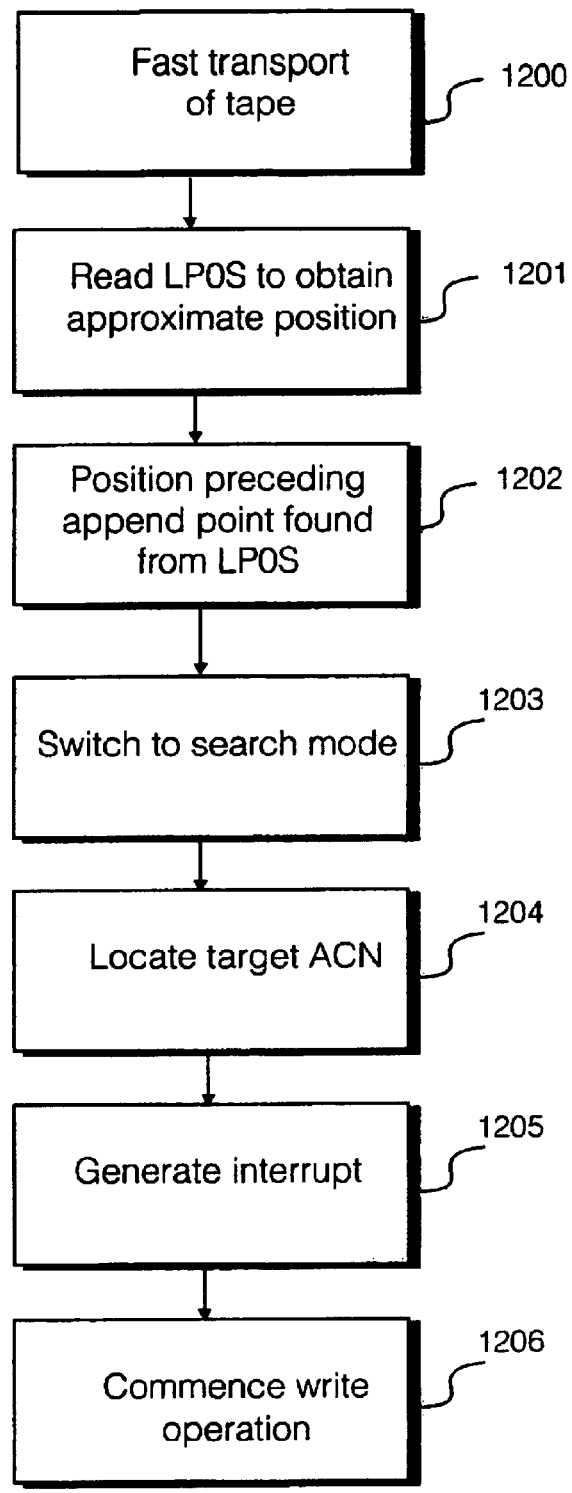
FIG. 12 illustrates schematically processes carried out by the tape data storage device for locating an append point according to a specific implementation of the present invention.

Referring to FIG. 12 herein, there is illustrated schematically a process carried out by the tape device for locating an append point. In step 1200 the tape drive undergoes fast transport, either fast forward or fast rewind, to find the approximate position along the tape at which the append point is known. In process 1201 the linear position data is continuously read during the fast forward or fast rewind to obtain the approximate position. Once an approximate position immediately preceding the position of the append point is determined in step 1202, that is, the LPOS information corresponding to a set of C1 code word quads immediately before the searched for append point, in either the forward or reverse direction, is found, then in step 1203 the tape drive switches to a search mode, in which a search for the absolute C1 code word quad set number is made. Once a target absolute code word quad number ACN is found in step 1204, an interrupt is generated in step 1205 to stop or slow the tape, and a write operation is commenced at a position after the append point in step 1206. The tape drive may need to reverse direction from rewind to forward, or may need to slow from a search speed to a write speed in the same direction, depending on the direction of the tape travel during search.

Figure 13:
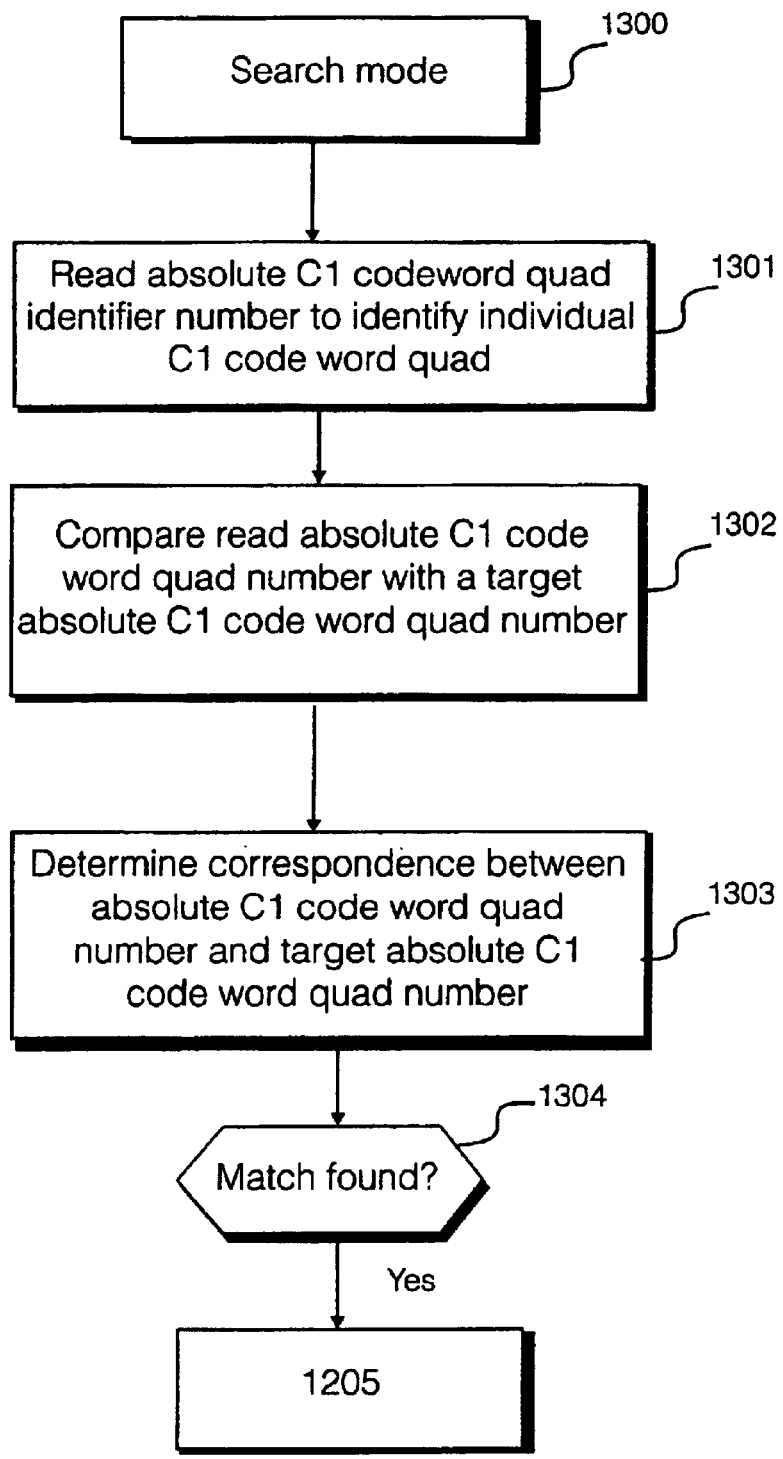
FIG. 13 illustrates schematically processes carried out within a search mode for reading C1 code word quad identifier numbers and comparing them to a target absolute code word quad number to determine if a match is found.

Referring to FIG. 13 herein, there is illustrated schematically processes carried out in the search mode. In process 1301 for code words passing the read head, the absolute C1 code word quad identifier numbers are read to identify the individual C1 code word quads in a data string read from the data storage medium. In process 1302, the absolute C1 code word quad numbers are compared with the target absolute C1 code word quad number corresponding to a position to be located on the data storage medium. In step 1303 there is determined a correspondence between the absolute C1 code word quad numbers streaming from the data storage medium, and the target absolute C1 code word quad number. When a match is found in step 1304, then an interrupt is generated in step 1205.

Figure 14:
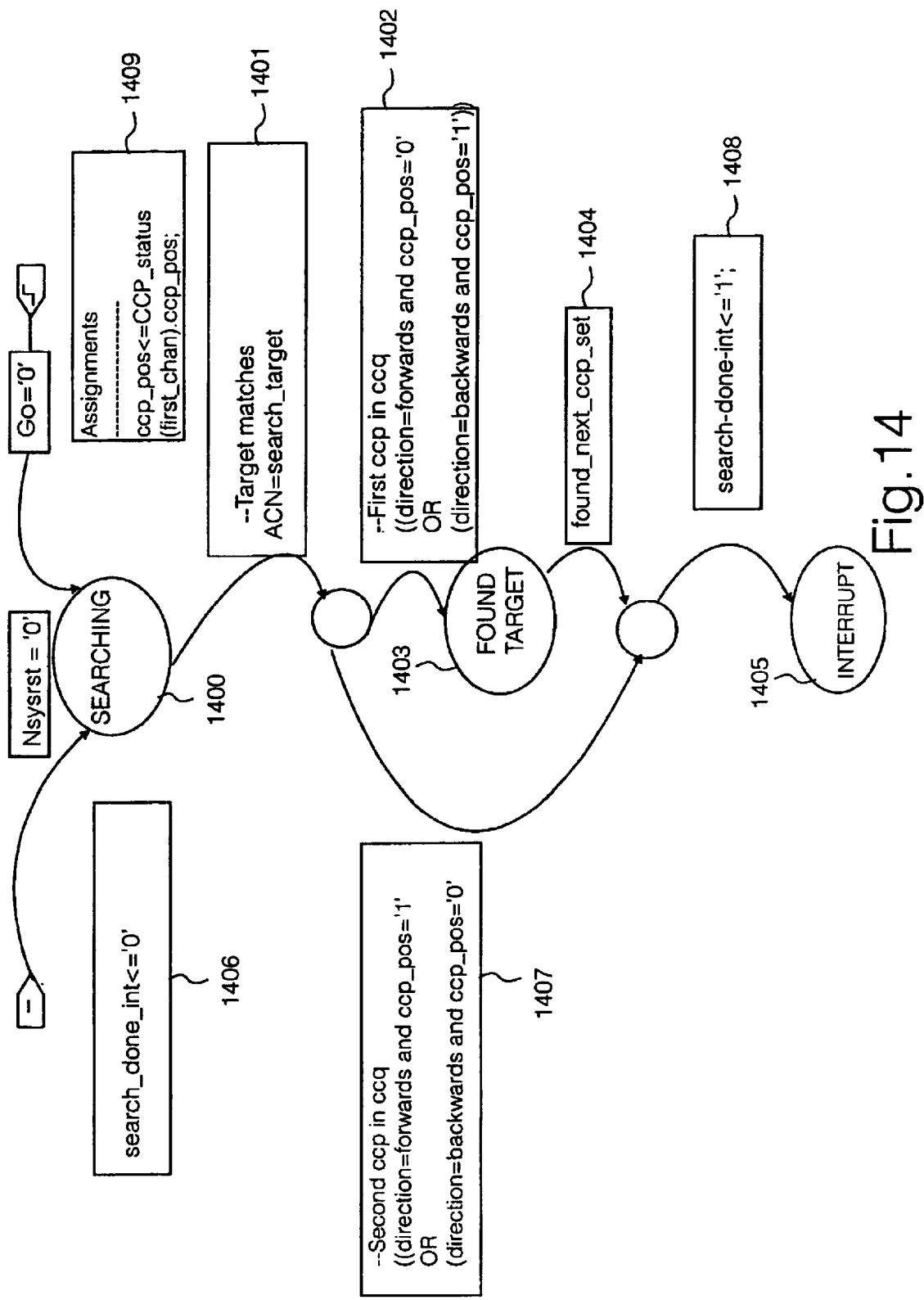
FIG. 14 illustrates schematically a state model and process steps for implementing a search mode for an append point along a length of linear tape data storage medium.

Referring to FIG. 14 herein, there is illustrated schematically a state model and processes carried out by search control component 207 of the tape drive, according to a specific implementation of the present invention. The search control component may be implemented as hardware in newly manufactured tape drive mechanisms, for example in the form of an application specific integrated circuit (ASIC), or as a download of program code for programming a prior art tape data storage device to provide a firmware implementation of the search method. Program code downloads for upgrade of existing prior art linear tape drive components to provide a tape data storage device according to the present invention may be implemented in known technology, in a known programming language. The state model with annotation and pseudo code according to a best mode implementation of the present invention, as shown in FIG. 14, which can be converted directly into a program code for creating a firmware search control component 207.

In search process 1400, 8 channels at once are searched corresponding to 8 tracks along tape, reading in the ACN for each C1 code word pair as the tape travels past the read head, giving rise to a data stream of 8 ACN's in parallel. The ACN ought to be the same at any position along the tape, for all 8 channels. That is, the ACN is unique to a C1 code word quad at any point along a particular channel. The search target is the ACN value which defines the append point.

The code portions in FIG. 14 are written in visual HDL, which is a known graphical entry tool, such that the process of FIG. 14 programmed into the tool results in output of VHDL (very high speed integrated circuit hardware description language) language for implementing the specific method herein. Visual HDL is a known industry standard tool, however there are other graphical tools on the market which perform similarly to visual HDL, and which may also be used to implement a state model as illustrated in FIG. 14.

A target ACN corresponding to a particular position on the tape is stored in memory. In process 1401 the stream of ACN's are compared with the target ACN, to see if the read ACN matches the target ACN.

If a match is not found, then the tape drive continues to search along the tape, comparing the read ACNs with the target ACN, until a pre-determined time out limit is reached, or until the end of the tape is reached.

For each C1 code word quad, there are two C1 code word pairs, which means that there are two instances of the ACN read per C1 code word quad. Because the ACN is unique to a particular C1 code word quad per channel, the two ACNs read from a single code word quad should be identical. Either of the ACNs per C1 code word quad can be used as the basis for finding an append point. However, because there are two ACNs per C1 code word quad, this increases the reliability of finding a particular ACN. Additionally, it is known whether it is the first C1 code word pair or the second C1 code word pair within a C1 code word quad which is being read, because the first C1 code word pair is preceded by a VFO and the forward synchronization field, where as the second code word pair is preceded by a resynchronization field. Therefore, whichever direction the tape is travelling with respect to the read head the first and second C1 code word pairs within a C1 code word quad can be distinguished from each other.

In process 1402, where the first C1 code word pair in a C1 code word quad having the target ACN is found, then subsequently in process 1404 a next ACN in the same C1 code word quad is found. Therefore, this designates the end of the C1 code word quad and the process moves to interrupt state 1405 for generating an interrupt. The interrupt is generated at the end of the C1 code word quad containing the target ACNs. Therefore, appending of newly written data can commence after the end of the C1 code word quad containing the target ACNs.

In process 1402, if the C1 code word pair is the first one found in a C1 code word quad and the direction of the tape is forwards, or if the C1 code word pair is the second C1 code word pair of a C1 code word quad and the tape is moving backwards then the tape drive moves into found target mode 1403.

Having found the first C1 code word pair in process 1400, the process proceeds directly into found target state 1403, which waits for the finding of the other C1 code word pair in the C1 code word quad in process 1404 before proceeding to the interrupt state and process 1405. In other words, having found the first C1 code word pair containing a target ACN, the process waits to find a second C1 code word pair, before going into the interrupt process 1405. This is to ensure that the interrupt is generated at the end of the C1 code word quad, rather than midway through.

Whilst in found target state 1403, the tape transport mechanism keeps moving the tape, searching for the second C1 code word pair.

In process 1406, if the tape drive is in a reset state, signal search_done_int is held in a low state. These signals are held low during reset, to avoid the possibility of an erroneous interrupt being generated during a reset process.

Process 1407 checks for the condition that the search target is found, and activates moving out of the search mode. Process 1407 operates such that once searching mode has been moved out of by the tape drive, a decision needs to be made whether to go into the found target mode 1403, or directly into interrupt generation 1405. If the tape is moving forwards, and the C1 code word pair is the second C1 code word pair in a C1 code word group, then the tape drive proceeds directly into the interrupt mode 1405. If the tape is moving backwards, and the C1 code word pair is the first C1 code word pair read by the read channel from the C1 code word quad, then the tape drive is switched directly into the interrupt mode 1405.

In process 1404, where the drive is in found target state 1403, when the next C1 code word pair is read, regardless of whether it has the same ACN as previously or not, the tape drive then moves into interrupt mode 1405.

In process 1408, when the tape drive moves into the interrupt mode 1405, the signal search_done_int is set to be one. Signal search_done_int is an interrupt signal which lets the firmware know that the target has been found.

As shown in item 1409 CCP-POS is a signal used to determine whether the firmware has identified the first C1 code word pair, or the second C1 code word pair in the C1 code word quad. The first C1 code word pair is the first C1 code word pair which the read head reads off the tape, irrespective of which direction it is travelling, and similarly the second C1 code word pair is the second C1 code word pair having the target ACN, which the read head reads off the tape.

Detection of the interrupt indicates that writing should begin. It may involve stopping the tape if a change of direction is required, that is if searching is done backwards through data, in order to write data, direction must be changed so that writing is in a forwards direction. The direction of data reading is not necessarily coincident with a direction of travel of a tape data storage medium across a tape read head. In this instance "backwards" indicates reading through data backwards, which is not necessarily the same as a tape data storage medium moving backwards in a cartridge, but could be. A tape data storage medium may move forwards through a cartridge, whilst data is being written/read backwards, or the direction of tape may be the same as the direction of reading/writing of data.

It will be appreciated that in this specification, the term "finding a position of an append point" includes finding an append point after a reposition of tape, as well as finding a position of an append point upon introducing a tape data storage medium to a tape data storage device.

What is claimed is:

1. A method of locating a position on a linear data storage medium onto which data are to be written, said method comprising the steps of:
    transporting said linear data storage medium past a read head;
    reading linear position data describing a linear position along said linear data storage medium;
    determining an approximate position of an append position from which to start writing data by responding to the read linear position;
    having found said approximate position of said append point, reading an absolute C1 code word quad identifier number to identify individual C1 code word quads along the length of said data storage medium;
    comparing said read absolute C1 code word quad number with a target absolute C1 code word quad number;
    finding a correspondence between said read absolute C1 code word quad number and said target absolute C1 code word quad number;
    if a match between said read absolute C1 code word quad and said target absolute C1 code word quad number is found, then generating an interrupt signal to interrupt transport of said data storage medium past said read head; and
    then commencing a write operation at a position on the medium where said read absolute C1 code word quad number matches said target absolute C1 code word quad number.

2. The method as claimed in claim 1, wherein said step of reading an absolute C1 code word quad number comprises:
    reading at least one absolute C1 code word quad number.

3. The method as claimed in claim 1, further comprises the step of:
    distinguishing between a first and second written C1 code word pair within a same C1 code word quad, by searching for a synchronization field selected from the set:
    a forward synchronization field;
    a back synchronization field; and
    a re-synchronization data field.

4. A method of locating an append point along a length of linear data storage medium, said append point indicating a position onto which data are to be written along said linear data storage medium, said method comprising the steps of:
    reading a plurality of absolute C1 code word quad numbers from at least one track of said data storage medium;
    comparing said read absolute C1 code word quad number with a pre-stored target absolute C1 code word quad number;
    finding a match between a read absolute C1 code word quad number and said stored target absolute C1 code word quad number; and
    generating an interrupt signal for interrupt of transport of said tape data storage medium based on the found match.

5. The method as claimed in claim 4, further comprising the steps of:
    distinguishing between a pair of absolute C1 code word quad numbers read from a pair of C1 code word pairs within a C1 code word quad; and
    selecting said append point as a first said C1 code word pair within said C1 code word quad.

6. The method as claimed in claim 4, further comprising the step of;
    distinguishing between a pair of absolute C1 code word quad numbers, read from respective first and second C1 code word pairs within a C1 code word quad by examining a data field selected from the set:
    a forward synchronization data field;
    a re-synchronization data field;
    a back synchronization data field; and
    a data separation data field.

7. A memory storing a computer program comprising program instructions for enabling a computer to locate a position on a data storage medium onto which data are to be written, said program instructions being such as to cause the computer to perform a method comprising:
    transporting said data storage medium past a read head;
    reading linear position data describing a linear position along said linear data storage medium;
    determining an approximate position of an append position from which to start writing data by responding to the read linear position;
    having found said approximate position of said append point, reading an absolute C1 code word quad identifier number to identify individual C1 code word quads along the length of said data storage medium;
    comparing said read absolute C1 code word quad numbers with a target absolute C1 code word quad number;
    finding a correspondence between said read absolute C1 code word quad number and said target absolute C1 code word quad number;
    if a match between said read absolute C1 code word quad and said target absolute C1 code word quad number is found, then generating an interrupt signal to interrupt transport of said data storage medium past said read head; and
    then commencing a write operation at a position on the medium where said read absolute C1 code word quad number matches said target absolute C1 code word quad number.

8. A recording medium comprising program instruction data for enabling a computer to locate a position on a data storage medium onto which data are to be written, said program instructions being such as to cause a computer to perform a method comprising the steps of:

transporting said data storage medium past a read head;

reading linear position data describing a linear position along said linear data storage medium;

determining an approximate position of an append position from which to start writing data by responding to the read linear position;

having found said approximate position of said append point, reading an absolute C1 code word quad identifier number to identify individual C1 code word quads along the length of said data storage medium;

comparing said read absolute C1 code word quad numbers with a target absolute C1 code word quad number;

finding a correspondence between said read absolute C1 code word quad number and said target absolute C1 code word quad number;

if a match between said read absolute C1 cede word quad and said target absolute C1 code word quad number is found, then generating an interrupt signal to interrupt transport of said data storage medium past said read head; and then commencing a write operation at a position on the medium where said read absolute C1 code word quad number matches said target absolute C1 code word quad number.

9. The recording medium as claimed in claim 8, comprising a read only memory device.

10. An electrical signal comprising digital program instruction data for enabling a computer to locate a position on a data storage medium onto which data are to be written, said program instructions being such as to cause a computer to perform a method comprising the steps of:

transporting said data storage medium past a read head;

reading linear position data describing a linear position along said linear data storage medium;

determining an approximate position of an append position from which to start writing data by responding to the read linear position;

having found said approximate position of said append point, reading an absolute C1 code word quad identifier number to identify individual C1 code word quads along the length of said data storage medium;

comparing said read absolute C1 code word quad numbers with a target absolute C1 code word quad number;

finding a correspondence between said read absolute C1 code word quad number and said target absolute C1 code word quad number;

if a match between said read absolute C1 code word quad and said target absolute C1 code word quad number is found, then generating an interrupt signal to interrupt transport of said data storage medium past said read head; and than commencing a write operation at a position on said medium where said read absolute C1 code word quad number which matches said target absolute C1 code word quad number.

11. A tape data storage device comprising:

a read head and a write head;

a tape transport mechanism for transporting said linear tape data storage medium across said read head and said write head; and a search component operable to:

read a linear position data describing a linear position along said linear tape data storage medium;

determine an approximate position of an append position from which to start writing data in response to the read linear position;

read an absolute C1 code word quad identifier number to identify individual C1 code word quads along a length of said linear tape data storage medium;

compare said read absolute C1 code word quad number with a target absolute C1 code word quad number;

find a correspondence between said read absolute C1 code word quad number and said target absolute C1 code word quad number;

if a match between said read absolute C1 code word quad and said target absolute C1 code word quad number is found, than generate an interrupt signal to interrupt transport of said linear tape data storage medium past said read head; and then commence a write operation at a position on the medium where said read absolute C1 code word quad number which matches said target absolute C1 code word quad number.

12. A method of locating a position on a data storage medium from which to write data, said method comprising the steps of:

transporting said linear data storage medium past a read head;

reading an absolute C1 code word quad identifier number to identify an individual C1 code word quad along a length of said data storage medium;

comparing said read absolute C1 code word quad number with a target absolute C1 code word quad number;

determining a correspondence between said read absolute C1 code word quad number and said target absolute C1 quad number; and on finding a correspondence, generating an interrupt signal to interrupt transport of said data storage medium past said read head.

13. The method of claim 12, further comprising responding to the interrupt signal by commencing a write operation at a position on the medium where said read absolute C1 code word quad number which matches said target absolute C1 code word quad number.

* * * * *